(12) United States Patent
Cuttino

(10) Patent No.: US 10,001,420 B2
(45) Date of Patent: Jun. 19, 2018

(54) INSTRUMENTED SPINDLE OR LOAD CELL FOR HIGH LOAD, HIGH RESOLUTION

(71) Applicant: James F. Cuttino, Huntersville, NC (US)

(72) Inventor: James F. Cuttino, Huntersville, NC (US)

(73) Assignee: LINK MANUFACTURING, INC., Plymouth, MI (US)

( * ) Notice: Subject to any disclaimer, the term of this patent is extended or adjusted under 35 U.S.C. 154(b) by 0 days. days.

(21) Appl. No.: 15/364,624

(22) Filed: Nov. 30, 2016

(65) Prior Publication Data

US 2017/0153151 A1 Jun. 1, 2017

Related U.S. Application Data

(60) Provisional application No. 62/260,951, filed on Nov. 30, 2015.

(51) Int. Cl.
*G01N 3/08* (2006.01)
*G01L 1/04* (2006.01)

(52) U.S. Cl.
CPC ..................... *G01L 1/04* (2013.01)

(58) Field of Classification Search
CPC ... G01G 3/08; G01G 3/00; G01L 1/04; G01L 9/0054; G01L 7/00; G01L 9/00; G01L 7/02; G01N 3/08
USPC .......................................................... 73/788
See application file for complete search history.

(56) References Cited

U.S. PATENT DOCUMENTS

| | | | |
|---|---|---|---|
| 3,484,732 A | 12/1969 | Postma | |
| 4,037,675 A * | 7/1977 | Storace | G01G 3/08 |
| | | | 177/229 |
| 4,375,243 A * | 3/1983 | Doll | G01G 3/142 |
| | | | 177/164 |
| 4,690,230 A | 9/1987 | Uchimura et al. | |
| 4,842,085 A | 6/1989 | Lang | |
| 7,569,779 B2 * | 8/2009 | Kresina | G01G 1/18 |
| | | | 177/210 EM |

(Continued)

OTHER PUBLICATIONS

Feb. 7, 2017 International Search Report issued in International Patent Application No. PCT/US2016/063951.

*Primary Examiner* — Harshad R Patel
*Assistant Examiner* — Octavia Hollington
(74) *Attorney, Agent, or Firm* — Clements Bernard Walker PLLC; Christopher L. Bernard

(57) ABSTRACT

An assembly operable for measuring one of a force and a moment, comprising: a compliant flexure mechanism that is one of deflected and deformed under an applied load; a low resolution load sensor coupled to the compliant flexure mechanism and operable for measuring one of the deflection and the deformation of the compliant flexure mechanism under a relatively higher load; and a high resolution load sensor coupled to the compliant flexure mechanism and operable for measuring one of the deflection and the deformation of the compliant flexure mechanism under a relatively lower load; wherein the high resolution load sensor is one of a non-contact sensor that is disposed at a distance from the compliant flexure mechanism and a contact sensor that is not subject to damage by the relatively higher load. Optionally, the low resolution load sensor is disposed adjacent to a narrowed neck portion of the compliant flexure mechanism.

14 Claims, 3 Drawing Sheets

(56) References Cited

U.S. PATENT DOCUMENTS

2009/0090564 A1   4/2009   Kresina

* cited by examiner

INSTRUMENTED SPINDLE OR LOAD CELL FOR HIGH LOAD, HIGH RESOLUTION

CROSS-REFERENCE TO RELATED APPLICATION

The present patent application/patent claims the benefit of priority of U.S. Provisional Patent Application No. 62/260,951, filed on Nov. 30, 2015, and entitled "INSTRUMENTED SPINDLE OR LOAD CELL FOR HIGH LOAD, HIGH RESOLUTION," the contents of which are incorporated in full by reference herein.

FIELD OF THE INVENTION

The present invention relates generally to devices and assembles for measuring forces and moments. More specifically, the present invention relates generally to an instrumented spindle or load cell for high load, high resolution.

BACKGROUND OF THE INVENTION

Instrumented spindles and load cells are used to measure a number of things, including, for example, the forces and moments on a tire. In most cases, there is a tradeoff between high load and high resolution. It is difficult to measure a high load with high resolution.

Load cells typically utilize an engineered compliance to operate. For example, a typical method is to build a device that is strong enough to hold a given load range, but has an engineered compliance range that can be measured, often in the form of a displacement or a strain given the load applied. This is how a fish scale works—there is a spring that provides a compliance (i.e. stretch) that is proportional to the load applied. The resulting displacement of the hook due to the stretch of the spring is measured by a dial or indicator. A calibration factor is applied to correlate the position of the dial or indicator to a particular load. Higher loads often require stiffer measuring instruments, but stiffer measuring instruments make it difficult to attain higher resolutions due to limitations in instrumentation. For example, to measure a whale, the fish scale would need to have an extremely stiff spring, otherwise it would fail under the load. If one tries to use the same fish scale to weigh a goldfish, the very stiff spring would not deform enough to be measured by the dial or indicator using the naked eye. Thus, the problem of high load versus high resolution.

Thus, what is still needed in the art is an instrumented spindle or load cell that is capable of measuring a range of loads, including high loads, with high resolution, while avoiding the need to utilize expensive instrumentation.

BRIEF SUMMARY OF THE INVENTION

In various exemplary embodiments, the present invention provides a dual sensor approach for measuring a range of loads, including high loads, with high resolution, while avoiding the need to utilize expensive instrumentation. In this dual sensor approach, a typical strain gage or other sensing device is used to measure heavy loads, but a second, much higher resolution, non-contacting (or other) metrology system is used in parallel to measure displacement of the strain gage (or other) load cell until the range of the non-contacting (or other) metrology system is exceeded, at which time the strain gage (or other) load cell takes over.

Using the fish scale analogy, this is equivalent to putting a high resolution microscope on the dial and observing the smallest deflection of the dial. Even a spring strong enough to hold a whale deflects some amount under the weight of the goldfish. With the high resolution microscope, one might see the hook move a few nm or so, and one can calibrate this value to give an accurate weight of the goldfish. The difficulty is that under higher loads, one may move outside the viewing area of the high resolution microscope. However, since it is not contacting the fish scale dial, it will not be damaged, and one can simply begin to observe the dial with the naked eye once the loads are large enough to move the dial significantly. Either way, the structural stiffness of the scale is sufficient to hold the larger weight.

This technique is applied to build a spindle or load cell with sufficient stiffness to maintain large loads, while using a secondary (non-contact) metrology method to provide higher resolution for lower loads. One specific application is a measurement spindle that is designed to measure the forces and moments generated by a tire on a road surface (to analyze grip, traction, cornering, etc.). These forces can easily reach in the thousands of pounds for typical passenger cars. However, the rolling resistance of tires is also of great importance, as that affects the fuel economy of the vehicle. Rolling resistance will typically be much smaller, along the lines of 5-15 lbs. The present invention provides a means to measure both simultaneously.

In one exemplary embodiment, the present invention provides an assembly operable for measuring one of a force and a moment, comprising: a compliant flexure mechanism that is one of deflected and deformed under an applied load; a low resolution load sensor coupled to the compliant flexure mechanism and operable for measuring one of the deflection and the deformation of the compliant flexure mechanism under a relatively higher load; and a high resolution load sensor coupled to the compliant flexure mechanism and operable for measuring one of the deflection and the deformation of the compliant flexure mechanism under a relatively lower load; wherein the high resolution load sensor is one of a non-contact sensor that is disposed at a distance from the compliant flexure mechanism and a contact sensor that is not subject to damage by the relatively higher load. The assembly further comprises a support structure coupled to one or more of the compliant flexure mechanism, the low resolution load sensor, and the high resolution load sensor. The low resolution load sensor is a contact sensor that physically contacts the compliant flexure mechanism. Alternatively, the low resolution load sensor is a non-contact sensor that is disposed at a distance from the compliant flexure mechanism. Optionally, the low resolution load sensor is disposed adjacent to a narrowed neck portion of the compliant flexure mechanism. Optionally, the low resolution load sensor comprises a strain gage. Optionally, the high resolution load sensor comprises one of a capacitance gage, an eddy current probe, an optical sensor, and another type of high resolution sensor.

In another exemplary embodiment, the present invention provides a method for providing an assembly operable for measuring one of a force and a moment, comprising: providing a compliant flexure mechanism that is one of deflected and deformed under an applied load; providing a low resolution load sensor coupled to the compliant flexure mechanism and operable for measuring one of the deflection and the deformation of the compliant flexure mechanism under a relatively higher load; and providing a high resolution load sensor coupled to the compliant flexure mechanism and operable for measuring one of the deflection and the deformation of the compliant flexure mechanism under a relatively lower load; wherein the high resolution load sensor is one of a non-contact sensor that is disposed at a distance from the compliant flexure mechanism and a contact sensor that is not subject to damage by the relatively higher load. The method further comprises providing a support structure coupled to one or more of the compliant flexure mechanism, the low resolution load sensor, and the high resolution load sensor. The low resolution load sensor is a contact sensor that physically contacts the compliant flexure mechanism. Alternatively, the low resolution load sensor is a non-contact sensor that is disposed at a distance from the compliant flexure mechanism. Optionally, the low resolution load sensor is disposed adjacent to a narrowed neck portion of the compliant flexure mechanism. Optionally, the low resolution load sensor comprises a strain gage. Optionally, the high resolution load sensor comprises one of a capacitance gage, an eddy current probe, an optical sensor, and another type of high resolution sensor.

BRIEF DESCRIPTION OF THE DRAWINGS

The present invention is illustrated and described herein with reference to the various figures, in which like reference number are used to denote like device or assembly components/method steps, as appropriate, and in which.

DETAILED DESCRIPTION OF THE INVENTION

Again, in various exemplary embodiments, the present invention provides a dual sensor approach for measuring a range of loads, including high loads, with high resolution, while avoiding the need to utilize expensive instrumentation. In this dual sensor approach, a typical strain gage or other sensing device is used to measure heavy loads, but a second, much higher resolution, non-contacting (or other) metrology system is used in parallel to measure displacement of the strain gage (or other) load cell until the range of the non-contacting (or other) metrology system is exceeded, at which time the strain gage (or other) load cell takes over.

Again, using the fish scale analogy, this is equivalent to putting a high resolution microscope on the dial and observing the smallest deflection of the dial. Even a spring strong enough to hold a whale deflects some amount under the weight of the goldfish. With the high resolution microscope, one might see the hook move a few nm or so, and one can calibrate this value to give an accurate weight of the goldfish. The difficulty is that under higher loads, one may move outside the viewing area of the high resolution microscope. However, since it is not contacting the fish scale dial, it will not be damaged, and one can simply begin to observe the dial with the naked eye once the loads are large enough to move the dial significantly. Either way, the structural stiffness of the scale is sufficient to hold the larger weight.

Again, this technique is applied to build a spindle or load cell with sufficient stiffness to maintain large loads, while using a secondary (non-contact) metrology method to provide higher resolution for lower loads. One specific application is a measurement spindle that is designed to measure the forces and moments generated by a tire on a road surface (to analyze grip, traction, cornering, etc.). These forces can easily reach in the thousands of pounds for typical passenger cars. However, the rolling resistance of tires is also of great importance, as that affects the fuel economy of the vehicle. Rolling resistance will typically be much smaller, along the lines of 5-15 lbs. The present invention provides a means to measure both simultaneously.

Figure 1:
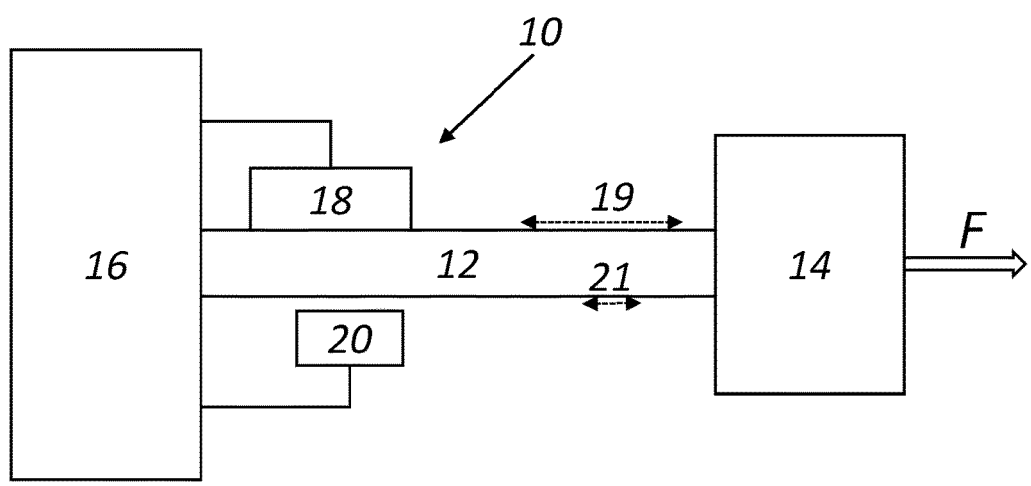
FIG. 1 is a schematic diagram conceptually illustrating the operation of one exemplary embodiment of the instrumented spindle or load cell of the present invention.

Referring now to FIG. 1, in one exemplary embodiment, the instrumented spindle or load cell 10 of the present invention includes a compliant flexure mechanism 12 that is stretched, compressed, twisted, flexed, or otherwise deflected or deformed under a load, F. The compliant flexure mechanism 14 may be coupled to any suitable support structure(s) 16. A contact (or non-contact) load sensor 18 is coupled to the compliant flexure mechanism 12 and configured to, directly or indirectly, measure gross deflection or deformation 19 under a relatively high load, F. A non-contact load sensor 20 is coupled to the compliant flexure mechanism 12 and configured to, directly or indirectly, measure fine deflection or deformation 21 under a relatively low load, F. Alternatively, the non-contact load sensor 20 can, directly or indirectly, measure deflection or deformation of the contact (or non-contact) load sensor 18. Because the non-contact load sensor 20 is non-contact, it is not damaged by a relatively high load, F. In this respect, the non-contact load sensor 20 can also be used to fine tune the gross measurement of the contact (or non-contact) load sensor 18. Accordingly, the non-contact load sensor 20 can also be a contact load sensor, provided that it is immune from damage by the relatively high load, F.

A wheel spindle or the like may use this technique to measure tire forces and moments, while also having sufficient resolution to measure rolling resistance without changing sensors (typically, two separate measuring machines are required, one for the large load case with lower resolution, and a second with higher resolution but very restricted maximum loads). In this case, the compliant flexure mechanism 12 may be designed to deflect a sufficient amount to maximize output of the strain gage 18 under maximum load, say, for example, 2000 lbs. Simultaneously, a separate capacitance gage or similar non-contacting instrument 20 can be used to monitor the deflection of the spindle axle under load. The capacitance gages 20 can have resolutions as fine as 0.8 nm or better. So, under light loads (such as those indicative of rolling resistance), although the flexure system does not deflect enough to achieve a significant signal from the strain gage 18, the capacitance probe 20 can easily detect the movement, providing accurate load determination even at low loads. As the load increases, the range of the capacitance probe 20 is exceeded, and the strain gage 18 is used to measure from that point forward. The capacitance gage 20 is non-contacting, so no damage will occur to the metrology system.

Figure 2:
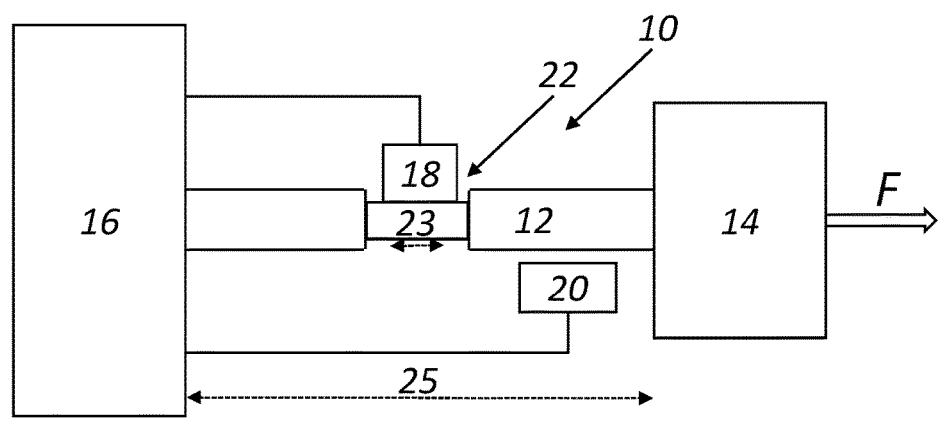
FIG. 2 is a schematic diagram conceptually illustrating the operation of another exemplary embodiment of the instrumented spindle or load cell of the present invention.

Referring now to FIG. 2, in another exemplary embodiment, the resolution of the instrumented spindle or load cell 10 can further be enhanced by allowing even more compliance of one metrology system over the other. In this case, a given load F (the value one ultimately wishes to determine) results in a deflection in the low resolution sensing region of $\delta l_s$ 23, but the same force results in a larger deflection, $\delta l_{hr}$ 25 in the full length of the beam 12. The smaller deflection $\delta l_s$ 23 protects the strain gage 18 from damage (strain gages are limited by approximately 1-2 millistrain, which determines the geometric design of the "neck" region 22 where it is attached). For clarity, strain is the change in sensed length, $\delta l_s$, divided by the sensed length, $l_s$.

$$\epsilon = \delta l_s / l_s \quad (1)$$

If a strain gage 18 had a length of 10 mm, 1 millistrain equates to a change in length of 0.01 mm. The cross section of the necked region 22 would therefore be designed to be thick enough to not exceed a deflection of 0.01-0.02 mm (for a max of 2 millistrain) while being thick enough to not fail under load, F.

The high resolution sensor 20 capitalizes on the higher deflection $\delta l_{hr}$ 25, since it is non-contacting and cannot be damaged by excessive deflection. An example of such a sensor may be a capacitance gage, eddy current probe, or optical based sensor. As an example, assume that the high resolution sensor 20 is a capacitance gage, with a resolution of 0.8 nm and an offset of 0.010". In that case, the bar may deflect a total distance of $\delta l_{hr}$ 25=0.005" and still be in the range of the capacitance gage with its exceptional resolution. After $\delta l_{hr}$ 25 exceeds that 0.005", the capacitance probe simply reads a maximum or minimum voltage with no damage to the probe.

Figure 3:
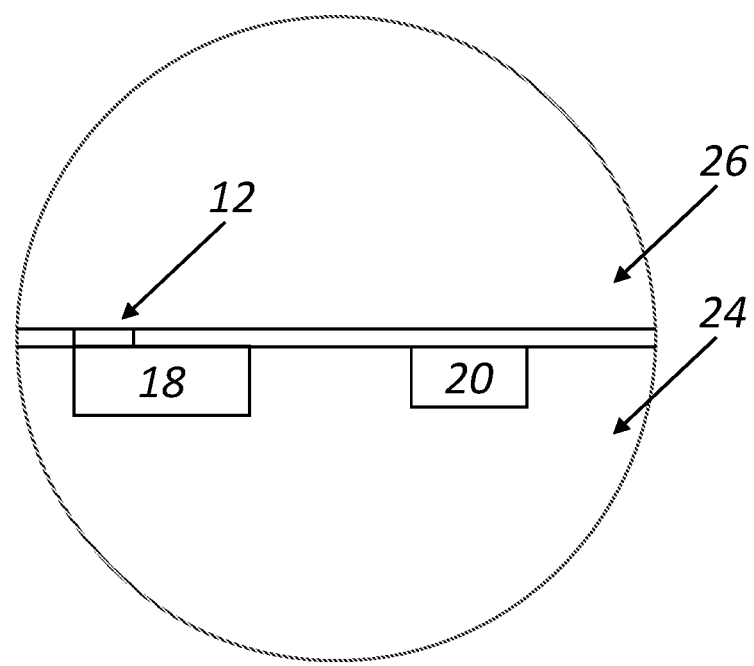
FIG. 3 is a schematic diagram conceptually illustrating the operation of a further exemplary embodiment of the instrumented spindle or load cell of the present invention.

Referring now to FIG. 3, a flexure 12 may support the moving piece 24 against a stationary piece 26, providing a 0.006" lateral movement when 3000 lbs are applied in the lateral direction, for example. Both strain gages 18 and cap gages 20 are provided to ascertain the relative movement.

The present invention is illustrated and described herein with reference to preferred embodiments and specific examples thereof. It will be readily apparent to those of ordinary skill in the art that other embodiments and examples may perform similar functions and/or achieve like results. All such equivalent embodiments and examples are within the spirit and scope of the present invention, are intended to be covered by the following claims, and are contemplated herein.

What is claimed is:

1. An assembly operable for measuring one of a force and a moment, comprising:
    a compliant flexure mechanism that is one of deflected and deformed under an applied load;
    a low resolution load sensor coupled to the compliant flexure mechanism and operable for measuring one of the deflection and the deformation of the compliant flexure mechanism under a relatively higher load; and
    a high resolution load sensor coupled to the compliant flexure mechanism and operable for measuring one of the deflection and the deformation of the compliant flexure mechanism under a relatively lower load;
    wherein the high resolution load sensor is a non-contact sensor that is disposed at a distance from the compliant flexure mechanism such that the high resolution load sensor is not subject to damage by the relatively higher load.

2. The assembly of claim 1, further comprising a support structure coupled to one or more of the compliant flexure mechanism, the low resolution load sensor, and the high resolution load sensor.

3. The assembly of claim 1, wherein the low resolution load sensor is a contact sensor that physically contacts the compliant flexure mechanism.

4. The assembly of claim 1, wherein the low resolution load sensor is a non-contact sensor that is disposed at a distance from the compliant flexure mechanism.

5. The assembly of claim 1, wherein the low resolution load sensor is disposed adjacent to a narrowed neck portion of the compliant flexure mechanism.

6. The assembly of claim 1, wherein the low resolution load sensor comprises a strain gage.

7. The assembly of claim 1, wherein the high resolution load sensor comprises one of a capacitance gage, an eddy current probe, and an optical sensor.

8. A method for providing an assembly operable for measuring one of a force and a moment, comprising:
    providing a compliant flexure mechanism that is one of deflected and deformed under an applied load;
    providing a low resolution load sensor coupled to the compliant flexure mechanism and operable for measuring one of the deflection and the deformation of the compliant flexure mechanism under a relatively higher load; and
    providing a high resolution load sensor coupled to the compliant flexure mechanism and operable for measuring one of the deflection and the deformation of the compliant flexure mechanism under a relatively lower load;
    wherein the high resolution load sensor is a non-contact sensor that is disposed at a distance from the compliant flexure mechanism such that the high resolution load sensor is not subject to damage by the relatively higher load.

9. The method of claim 8, further comprising providing a support structure coupled to one or more of the compliant flexure mechanism, the low resolution load sensor, and the high resolution load sensor.

10. The method of claim 8, wherein the low resolution load sensor is a contact sensor that physically contacts the compliant flexure mechanism.

11. The method of claim 8, wherein the low resolution load sensor is a non-contact sensor that is disposed at a distance from the compliant flexure mechanism.

12. The method of claim 8, wherein the low resolution load sensor is disposed adjacent to a narrowed neck portion of the compliant flexure mechanism.

13. The method of claim 8, wherein the low resolution load sensor comprises a strain gage.

14. The method of claim 8, wherein the high resolution load sensor comprises one of a capacitance gage, an eddy current probe, and an optical sensor.

* * * * *